United States Patent
Suzuki et al.

(10) Patent No.: US 9,635,303 B2
(45) Date of Patent: *Apr. 25, 2017

(54) COMMUNICATION DEVICE AND COMMUNICATION METHOD

(75) Inventors: Nobuaki Suzuki, Akishima (JP); Makoto Sato, Hino (JP); Masahiko Mawatari, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 398 days.

This patent is subject to a terminal disclaimer.

(21) Appl. No.: 13/584,376

(22) Filed: Aug. 13, 2012

(65) Prior Publication Data

US 2013/0100244 A1  Apr. 25, 2013

(30) Foreign Application Priority Data

Oct. 20, 2011  (JP) .................................. 2011-231186
May 15, 2012  (JP) .................................. 2012-111976

(51) Int. Cl.
*H04N 5/38* (2006.01)
*G06F 3/14* (2006.01)
(Continued)

(52) U.S. Cl.
CPC ................ *H04N 5/38* (2013.01); *G06F 3/14* (2013.01); *G09G 5/006* (2013.01); *H04N 5/765* (2013.01);
(Continued)

(58) Field of Classification Search
CPC .. G06F 3/14; G09G 2370/12; G09G 2350/00; G09G 5/006; H04N 21/43622;
(Continued)

(56) References Cited

U.S. PATENT DOCUMENTS 5,654,773 A * 8/1997 Kajimoto ............... H04N 5/772
345/603
5,835,152 A   11/1998 Hori
(Continued)

FOREIGN PATENT DOCUMENTS

JP   H09-200801    7/1997
JP   2002-125207 A   4/2002
(Continued)

OTHER PUBLICATIONS

Extended European Search Report for corresponding European Application No. 12173573.2-1228, dated Jan. 24, 2013, in 7 pages.
(Continued)

*Primary Examiner* — Ricky Chin
*Assistant Examiner* — Jen-Shi Huang
(74) *Attorney, Agent, or Firm* — Knobbe, Martens, Olson & Bear LLP (57) ABSTRACT

One embodiment provides a communication device for transmitting a video to an external device through first to third transmission lines, the communication device including: a transmission module configured to transmit first color difference information and second color difference information concerned with adjacent two pixels through the first transmission line, to transmit first luminance information concerned with one of the two pixels through the second transmission line, and to transmit second luminance information concerned with the other of the two pixels through the third transmission line.

16 Claims, 9 Drawing Sheets (51) Int. Cl.
  *G09G 5/00* (2006.01)
  *H04N 5/765* (2006.01)
  *H04N 13/00* (2006.01)
  *H04N 21/41* (2011.01)
  *H04N 21/436* (2011.01)
  *H04N 21/4363* (2011.01)

(52) U.S. Cl.
  CPC ..... *H04N 13/0055* (2013.01); *H04N 21/4122* (2013.01); *H04N 21/43622* (2013.01); *G09G 2350/00* (2013.01); *G09G 2370/12* (2013.01); *H04N 21/43635* (2013.01)

(58) Field of Classification Search
  CPC ............... H04N 21/43635; H04N 5/38; H04N 13/0029; H04N 13/0055
  USPC .......................................................... 348/43
  See application file for complete search history.

(56) References Cited

U.S. PATENT DOCUMENTS

| | | | |
|---|---|---|---|
| 5,847,767 A * | 12/1998 | Ueda | 348/423.1 |
| 7,088,398 B1 | 8/2006 | Wolf et al. | |
| 7,257,163 B2 | 8/2007 | Hwang et al. | |
| 7,359,437 B2 | 4/2008 | Hwang et al. | |
| 7,379,121 B2 | 5/2008 | Suzuki et al. | |
| 7,636,132 B2 | 12/2009 | Sakamoto | |
| 8,077,243 B2 | 12/2011 | Morita et al. | |
| 8,190,786 B2 | 5/2012 | Nakahama | |
| 8,200,062 B2 | 6/2012 | Itani | |
| 8,290,339 B2 | 10/2012 | Noritake | |
| 8,422,553 B2 | 4/2013 | Fukuhara et al. | |
| 8,625,666 B2 | 1/2014 | Bakke | |
| 8,625,683 B2 | 1/2014 | Wu et al. | |
| 8,698,956 B2 | 4/2014 | Kondo et al. | |
| 8,984,181 B2 * | 3/2015 | Minemura | G09G 5/006 710/100 |
| 9,167,293 B2 | 10/2015 | Hirayama et al. | |
| 2002/0071052 A1 | 6/2002 | Itoh et al. | |
| 2002/0171761 A1 * | 11/2002 | Suzuki et al. | 348/484 |
| 2003/0151610 A1 | 8/2003 | Kurlakin et al. | |
| 2003/0206242 A1 | 11/2003 | Choi | |
| 2004/0208380 A1 | 10/2004 | Aoki et al. | |
| 2005/0200630 A1 | 9/2005 | Evans et al. | |
| 2006/0090141 A1 | 4/2006 | Loui et al. | |
| 2007/0040810 A1 | 2/2007 | Dowe et al. | |
| 2007/0081796 A1 | 4/2007 | Fredlund et al. | |
| 2007/0091120 A1 * | 4/2007 | Oura | 345/629 |
| 2007/0153918 A1 | 7/2007 | Rodriguez | |
| 2007/0160153 A1 | 7/2007 | Sullivan | |
| 2007/0188515 A1 | 8/2007 | Li | |
| 2007/0262979 A1 | 11/2007 | Klebanov | |
| 2007/0296859 A1 * | 12/2007 | Suzuki | G09G 5/006 348/473 |
| 2008/0101467 A1 | 5/2008 | MacMullan | |
| 2008/0101476 A1 | 5/2008 | Tian et al. | |
| 2008/0270635 A1 | 10/2008 | Nakahama | |
| 2009/0103947 A1 | 4/2009 | Inoue et al. | |
| 2009/0116970 A1 | 5/2009 | Inoue et al. | |
| 2009/0141180 A1 | 6/2009 | Kondo et al. | |
| 2009/0174818 A1 | 7/2009 | Morita et al. | |
| 2009/0213265 A1 * | 8/2009 | Yamashita | H04N 5/08 348/500 |
| 2009/0231487 A1 | 9/2009 | Nakagawa et al. | |
| 2009/0278984 A1 * | 11/2009 | Suzuki et al. | 348/554 |
| 2009/0290634 A1 | 11/2009 | Yamashita | |
| 2009/0316779 A1 | 12/2009 | Fukuhara | |
| 2010/0007787 A1 | 1/2010 | Yamashita | |
| 2010/0033627 A1 | 2/2010 | Hayashi et al. | |
| 2010/0066906 A1 | 3/2010 | Nakajima | |
| 2010/0073574 A1 | 3/2010 | Nakajima et al. | |
| 2010/0149412 A1 | 6/2010 | Yamashita | |
| 2010/0182402 A1 * | 7/2010 | Nakajima et al. | 348/42 |
| 2010/0214480 A1 | 8/2010 | Kitamori | |
| 2011/0038596 A1 | 2/2011 | Noritake | |
| 2011/0043701 A1 | 2/2011 | Kurita et al. | |
| 2011/0134318 A1 | 6/2011 | Chang et al. | |
| 2011/0134319 A1 | 6/2011 | Chang et al. | |
| 2011/0135199 A1 | 6/2011 | Choi et al. | |
| 2011/0205428 A1 | 8/2011 | Yamashita | |
| 2011/0273622 A1 | 11/2011 | Ngo et al. | |
| 2012/0069145 A1 * | 3/2012 | Sugimura | 348/43 |
| 2012/0293710 A1 | 11/2012 | Yamashita | |
| 2013/0055407 A1 | 2/2013 | Hirayama et al. | |
| 2013/0100244 A1 | 4/2013 | Suzuki et al. | |
| 2013/0141534 A1 | 6/2013 | Hattori | |
| 2013/0208183 A1 * | 8/2013 | Suzuki et al. | 348/453 |
| 2013/0251047 A1 | 9/2013 | Rodriguez | |
| 2013/0329138 A1 | 12/2013 | Minemura et al. | |
| 2014/0092211 A1 | 4/2014 | Nakajima et al. | |
| 2015/0124168 A1 | 5/2015 | Minemura et al. | |

FOREIGN PATENT DOCUMENTS

| | | |
|---|---|---|
| JP | 2002-290974 A | 10/2002 |
| JP | 2004-254133 A | 9/2004 |
| JP | 2004-343726 A | 12/2004 |
| JP | 2004-357012 A | 12/2004 |
| JP | 2005-514873 | 5/2005 |
| JP | 2007-311929 A | 11/2007 |
| JP | 2007-312376 A | 11/2007 |
| JP | 2008-252819 A | 10/2008 |
| JP | 2008-271460 | 11/2008 |
| JP | 2009-135726 | 6/2009 |
| JP | 2009-147738 A | 7/2009 |
| JP | 2009-213110 | 9/2009 |
| JP | 2009-213116 | 9/2009 |
| JP | 2010-011154 A | 1/2010 |
| JP | 2010-028261 A | 2/2010 |
| JP | 2010-193247 A | 9/2010 |
| JP | 2010-237726 A | 10/2010 |
| JP | 2011-044868 A | 3/2011 |
| JP | 2011-166198 A | 8/2011 |
| JP | 2013-031024 A | 2/2013 |
| JP | 2013-051606 A | 3/2013 |
| JP | 2015-029337 A | 2/2015 |
| WO | WO 03/058946 | 7/2003 |
| WO | WO 2008/053851 A1 | 5/2008 |
| WO | WO 2012/029885 | 3/2012 |

OTHER PUBLICATIONS

Japanese Office Action Decision of Refusal for corresponding Japanese Application No. 2013-055503, which is a divisional application of JP 2012-111976 to which this application claims priority, mailed Jul. 1, 2014, in 7 pages.
Japanese Office Action for corresponding Japanese Application No. 2012-111976, mailed Nov. 13, 2012, in 11 pages.
U.S. Appl. No. 15/141,702, Video Sender and Video Receiver, filed Apr. 28, 2016.
Thomas Kugelstadt, "Support HDMI 1.3 12-Bit Deep Color With the TMDS341A," Texas Instruments Incorporated, May 10, 2007, URL: http://www.ti.com/lit/an/slla263/slla263.pdf.
Notice of Rejection mailed by Japan Patent Office on May 21, 2013 in Japanese Patent Application 2012-131472—4 pages.
Notice of Rejection mailed by Japan Patent Office on Jul. 1, 2014 in Japanese patent application No. 2013-210165, which is a divisional application of JP 2012-131472, 5 pages.
The Extended European Search Report dated Sep. 10, 2013 issued by European Patent Office in European Patent Application No. 13153335.8, 10 pages.
Decision to Grant a Patent mailed by Japan Patent Office on Jan. 6, 2015 in the Japanese patent application No. 2013-210165, which is a divisional application for JP 2012-131472, 5 pages.
Notice of Rejection mailed by Japan Patent Office on May 19, 2015 in Japanese Patent Application No. 2015-010699.

* cited by examiner

| Byte# | 7 | 6 | 5 | 4 | 3 | 2 | 1 | 0 |
|---|---|---|---|---|---|---|---|---|
| 0 | Vender-specific tag code (=3) | | | Length (=N) | | | | |
| 1 | 24-bit IEEE Registration Identifier (0xXXXX) (least significant byte first) | | | | | | | |
| 2 | | | | | | | | |
| 3 | | | | | | | | |
| 4 | YCbCr (4:2:0) indicator — P10 | Rsvd (0) | Rsvd (0) | Rsvd (0) | Rsvd (0) | Rsvd (0) | Rsvd (0) | Rsvd (0) |
| 5 | VIC_1 | | | | | | | |
| 6 | VIC_2 | | | | | | | |
| 7 | VIC_3 | | | | | | | |
| 8 | VIC_4 | | | | | | | |
| 9 | VIC_5 | | | | | | | |
| 10 | VIC_6 | | | | | | | |
| N | Reserved | | | | | | | |

FIG. 7

| Byte# | 7 | 6 | 5 | 4 | 3 | 2 | 1 | 0 |
|---|---|---|---|---|---|---|---|---|
| PB0 | Checksum ||||||||
| PB1 | 24-bit IEEE Registration Identifier (0xXXXX) (least significant byte first) ||||||||
| PB2 | ||||||||
| PB3 | ||||||||
| PB4 | YCbCr (4:2:0) indicator | Rsvd (0) | Rsvd (0) | Rsvd (0) | Rsvd (0) | Rsvd (0) | Rsvd (0) | Rsvd (0) |
| PB5 | VIC ||||||||

P20 (PB4 YCbCr indicator)
P21 (PB5 VIC)

COMMUNICATION DEVICE AND COMMUNICATION METHOD

CROSS-REFERENCE TO RELATED APPLICATION(S)

This application claims priority/priorities from Japanese Patent Application No. 2011-231186 filed on Oct. 20, 2011; and Japanese Patent Application No. 2012-111976 filed on May 15, 2012; the entire contents of which are incorporated herein by reference.

FIELD

Embodiments described herein relate generally to a communication device and a communication method.

BACKGROUND

There is known HDMI (High Definition Multimedia Interface) Specification, as a multimedia interface between a video transmitter such as a DVD player or a set-top box and a video receiver such as a TV set or a monitor. A device having an HDMI output terminal is called source device, whereas a device having an HDMI input terminal is called sink device. For example, the video transmitter is a source device, whereas the video receiver is a sink device. And, a device having both an HDMI input terminal and an HDMI output terminal to function as both of a source device and a sink device is called repeater device.

An HDMI communication device for performing communication according to the HDMI Specification has: a TMDS (Transition Minimized Differential Signaling) transmission module which transmits video, audio and auxiliary information; a +5V power supply signal transmission module for informing a sink device or a repeater device of connection in the form of a source ready signal when a source device is connected to the sink device or the repeater device; an HPD (Hot Plug Detect) signal transmission module which transmits an HPD signal as a sink ready signal indicating that the sink device or the repeater device is ready for receiving video information; an EDID (Extended Display Identification Data) transmission module which transmits EDID which are data such as product information of the connected sink device and an adequate video format; an HDCP (High-bandwidth Digital Content Protection) authentication module which authenticates the sink device; and a CEC (Consumer Electronics Control) transmission module which transmits CEC including a device control signal and a control protocol.

There is a recently increasing demand for high-definition video of 3840×2160 called 4K2K. However, in transmission of such high quality video, the load imposed on a communication interface will increase.

BRIEF DESCRIPTION OF DRAWINGS

A general architecture that implements the various features of the present invention will now be described with reference to the drawings. The drawings and the associated descriptions are provided to illustrate embodiments and not to limit the scope of the present invention.

DETAILED DESCRIPTION

In general, one embodiment provides a communication device for transmitting a video to an external device through first to third transmission lines, the communication device including: a transmission module configured to transmit first color difference information and second color difference information concerned with adjacent two pixels through the first transmission line, to transmit first luminance information concerned with one of the two pixels through the second transmission line, and to transmit second luminance information concerned with the other of the two pixels through the third transmission line.

An embodiment will be described blow with reference to the drawings.

Figure 1:
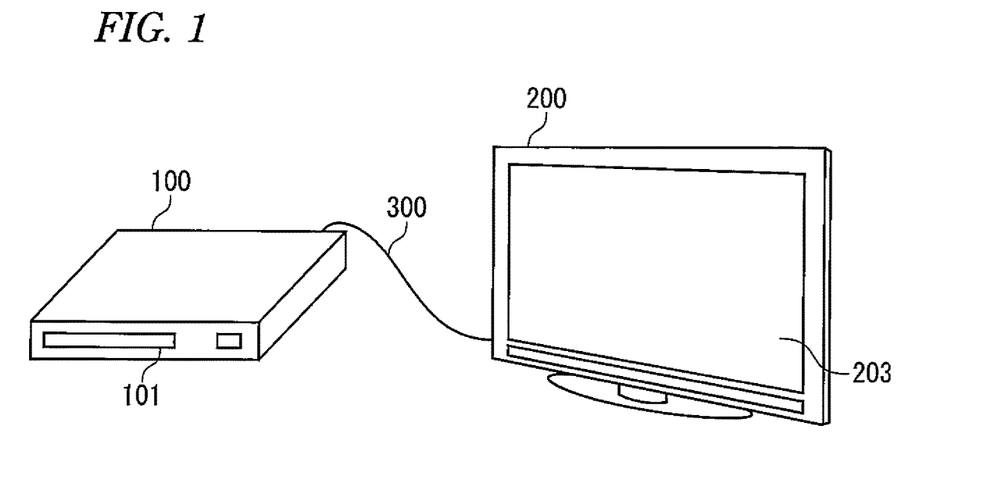
FIG. 1 illustrates a use form of a communication device according to an embodiment.

FIG. 1 illustrates a data transmission system according to a first embodiment.

In this data transmission system, a playback device 100 serving as a source device and a display device 200 serving as a sink device in this embodiment are connected to each other by an HDMI cable 300.

The playback device 100 has a reading module 101 and a storage module 102 (not shown in FIG. 1). The playback device 100 has a function of playing back (decoding) coded video data stored in an optical disk or the storage module 102. The playback device 100 then outputs decoded video data to the display device 200 through the HDMI cable 300. The display device 200 has a display module 203 and displays video based on received video data.

Figure 2:
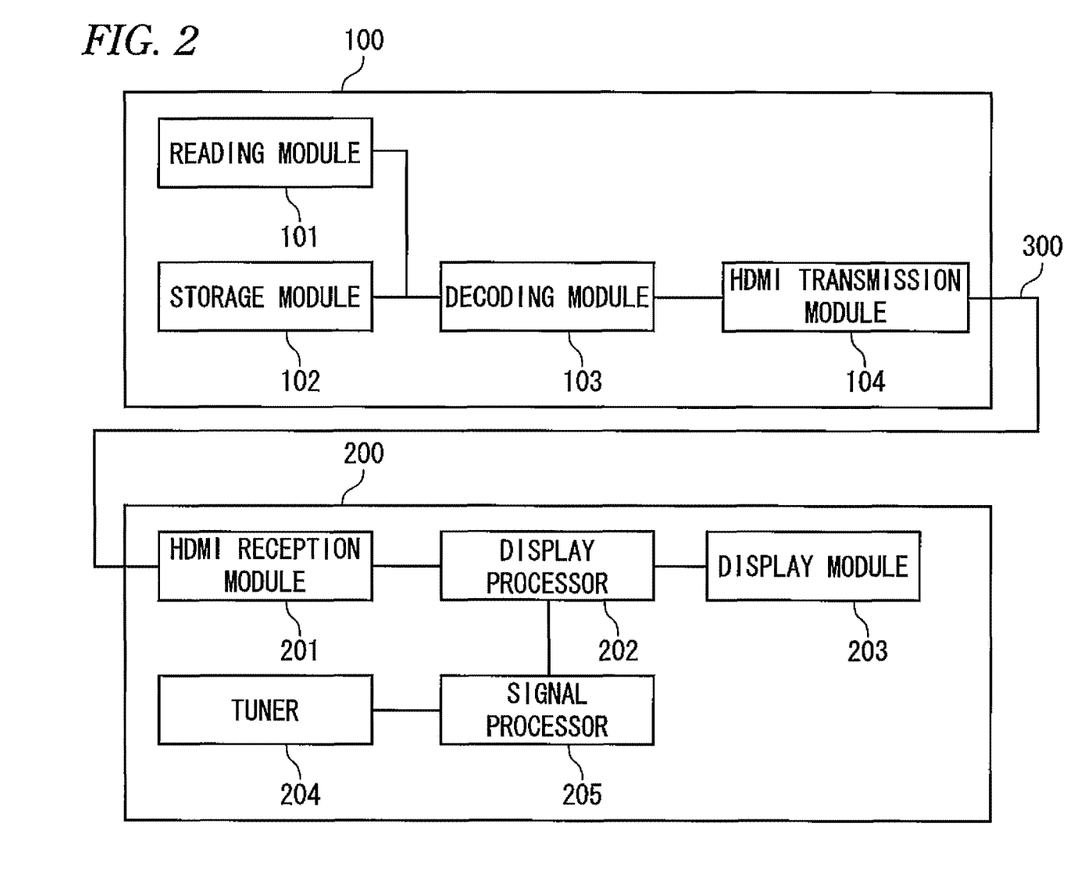
FIGS. 2 and 3 illustrate a system configuration of the communication device.

FIG. 2 illustrates the system configuration of the playback device 100 and the display device 200.

The playback device 100 has the reading module 101, the storage module 102, a decoding module 103, an HDMI transmission module 104, etc. The reading module 101 reads coded video data stored in an optical disk and outputs the coded video data to the decoding module 103. For example, the storage module 102 stores coded video data which has been recorded, and outputs the stored coded video data to the decoding module 103. The decoding module 103 decodes the input coded video data, for example, into video data of 8 bits in each of RGB, (YCrCb) 4:2:0 format, (YCrCb) 4:2:2 format or (YCrCb) 4:4:4 format. The HDMI transmission module 104 converts the decoded video data into a video signal of a specific transmission format, and outputs the video signal to the display device 200 through the HDMI cable 300.

The display device 200 has an HDMI reception module 201, a display processor 202, the display module 203, a tuner 204, a signal processor 205, etc. The HDMI reception module 201 receives a video signal and converts the received video signal into video data of a format (e.g. baseband data of 8 bits in each of RGB) compatible with the display processor 202. The display processor 202 converts the video data inputted from the HDMI reception module

201 and the signal processor 205 into a video signal of a format compatible with the display module 203, and outputs the video signal to the display module 203. The display module 203 displays video based on the input video signal.

The tuner 204 receives a television broadcasting signal. The signal processor 205 converts the received broadcasting signal into video data, and outputs the video data to the display processor 202.

Figure 3:
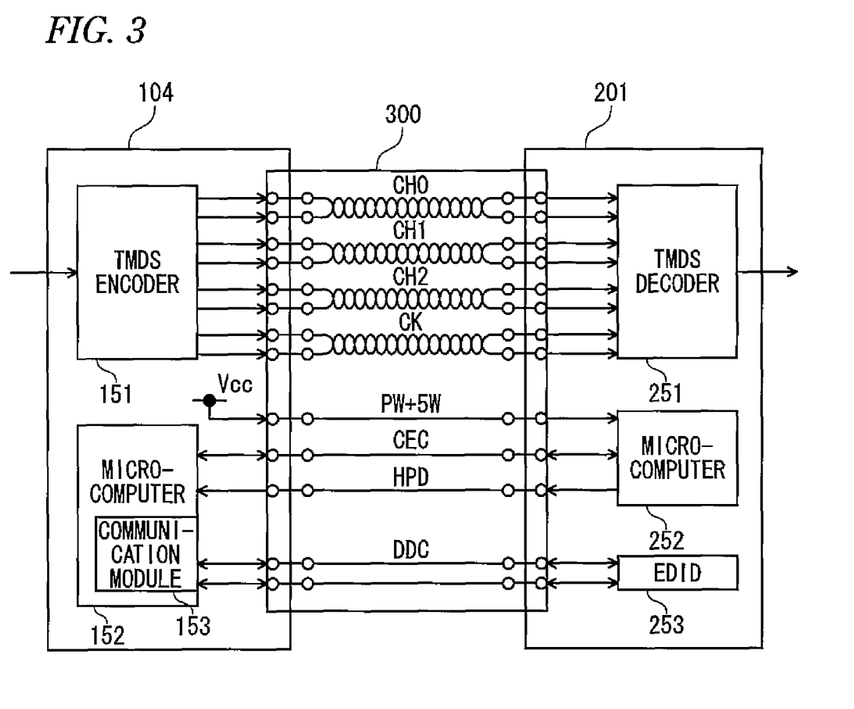

FIG. 3 illustrates the system configuration of the HDMI transmission module 104 of the playback device 100 and the HDMI reception module 201 of the display device 200.

The HDMI transmission module 104 has a TMDS encoder 151, a micro-computer 152, a communication module 153, etc. The HDMI reception module 201 has a TMDS decoder 251, a micro-computer 252, an EDID 253, etc.

Decoded video data from the decoding module 103 are inputted to the TMDS encoder 151. The TMDS encoder 151 converts the input video data into video data of a format which will be described later with reference to FIGS. 5A to 5C and FIG. 6, and outputs pixel clocks generated by the conversion to CH0-CH2 respectively. Then, differential amplifiers not shown convert the pixel clocks outputted from the TMDS encoder 151 into differential signals, and output the differential signals to transmission lines of CH0-CH2. The differential amplifiers are provided so as to correspond to the transmission lines of CH0-CH2 respectively. The differential signals are transmitted to the HDMI reception module 201 through the transmission lines of CH0-CH2.

The differential amplifiers (not shown) corresponding to CH0-CH2 respectively are provided in the HDMI reception module 201. Upon reception of the differential signals from CH0-CH2, the differential amplifiers convert the differential signals into data, and output the data to the TMDS decoder 251. The TMDS decoder 251 decodes these data into video data of 8 bits in each of RGB, and outputs the video data to the display processor 202.

The micro-computer 152 of the source device is connected to the micro-computer 252 of the sink device by a CEC line and an HPD line. The micro-computer 152 and the micro-computer 252 transmit information for mutual control of the devices through the CEC line. And, the micro-computer 152 informs the source device of signal transmission ready completion corresponding to power-on completion of the sink device through the HPD line.

The communication module 153 of the micro-computer 152 is connected to the EDID 253 of the sink device through a DDC line. The communication module 153 reads EDID data from the EDID 253.

(YCrCb) 4:2:0 format will be described below with reference to FIG. 4A.

For example, when the source video decoded in the playback device 100 is RGB 4:4:4, a large amount of data is required to transmit the video. Therefore, (YCrCb) 4:2:0 sampling is considered so that the amount of data is halved.

Figure 4A:
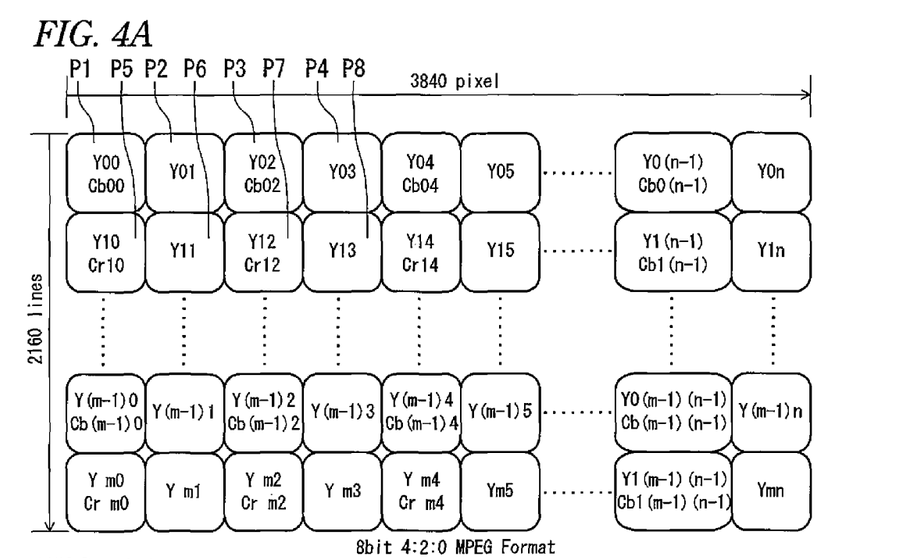
FIGS. 4A to 4C illustrate examples of a pixel encoding format of video transmitted by the communication device.

FIG. 4A illustrates the case where encoded signal of 4K2K video is converted into (YCrCb) 4:2:0 format signal by the decoding module 103. Here, luminance information Y00 shows luminance of pixel P1. First color difference information Cb00 shows color differences Cb concerned with four pixels, that is, pixel P1, pixel P2 adjacent to the pixel P1, and pixels P5 and P6 downward adjacent to the pixels P1 and P2. The first color difference information Cb00 may show the color difference Cb only for the pixel P1. Second color difference information Cr10 shows color differences Cr concerned with four pixels, that is, pixel P5, pixel P6 adjacent to the pixel P5, and pixels P1 and P2 upward adjacent to the pixels P5 and P6. The second color difference information Cr10 may show the color difference Cr only for the pixel P5. Luminance information Y01 shows luminance of pixel P2. Luminance information Y10 shows luminance of pixel P5. Luminance information Y11 shows luminance of pixel P6.

Similarly, luminance information Y02 shows luminance of pixel P3. First color difference information Cb02 shows color differences Cb concerned with four pixels, that is, pixel P3, pixel P4 adjacent to the pixel P3, and pixels P7 and P8 downward adjacent to the pixels P3 and P4. The first color difference information Cb02 may show the color difference Cb only for the pixel P3. Second color difference information Cr12 shows color differences Cr concerned with four pixels, that is, pixel P7, pixel P8 adjacent to the pixel P7, and pixels P3 and P4 upward adjacent to the pixels P7 and P8. The second color difference information Cr12 may show the color difference Cr only for the pixel P7. Luminance information Y03 shows luminance of pixel P4. Luminance information Y12 shows luminance of pixel P7. Luminance information Y13 shows luminance of pixel P8.

Figure 4B:
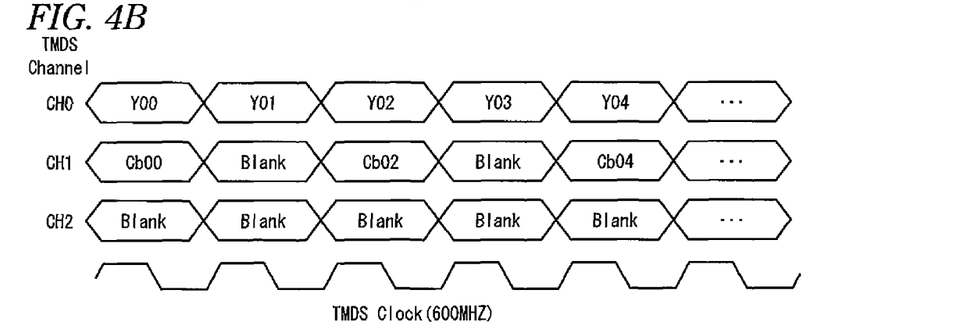
Figure 5A:
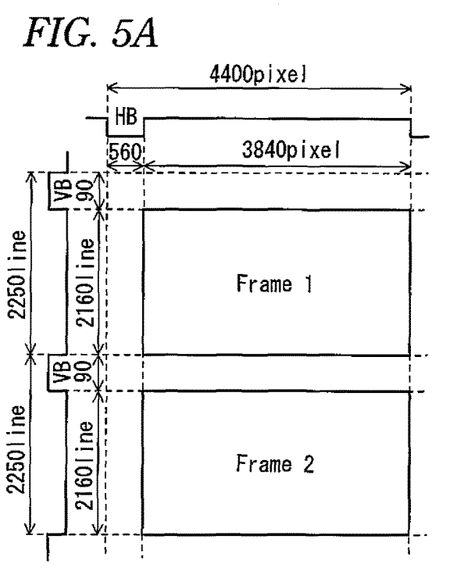
FIGS. 5A to 5C illustrate examples of a video timing format used by the communication device.

On this occasion, for example, as shown in FIG. 4B, when data of the format shown in FIG. 4A are to be pixel-encoded so as to be transmitted line by line and displayed on the display device at a speed of 60 frames per second, capability of 4400 pixels (=image horizontal direction 3840 pixels+HB (Horizontal Blank) 560 pixels)×2250 lines (=vertical 2160 lines+VB (Vertical Blank) 90 lines)×60Hz=594 megapixels per second is required (see FIG. 5A). That is, the pixel clock in this case is 594 MHz. Thus, the pixel encoding shown in FIG. 4B will cause failure of video transmission because the maximum transmission rate in a general HDMI is 340 MHz.

Figure 4C:
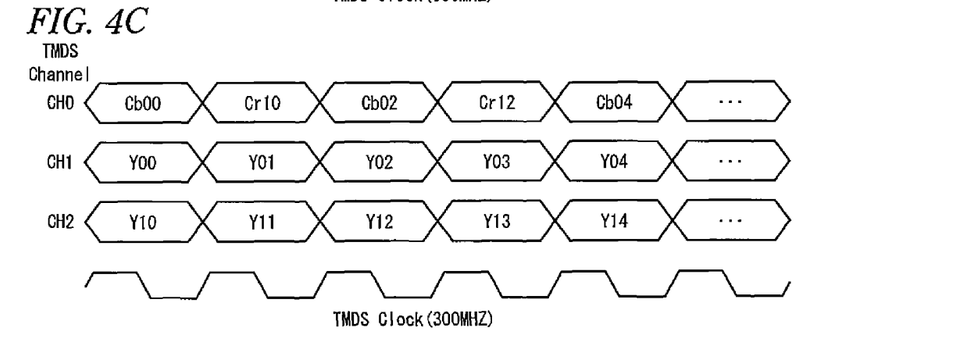

Therefore, as shown in FIG. 4C, when the TMDS encoder 151 performs pixel-encoding so that luminance components Y of data of the format shown in FIG. 4A are transmitted by every 2 lines and color difference components CbCr are transmitted collectively in one channel, source video data of 2160 lines can be transmitted through 1080 lines. That is, in the method shown in FIG. 4C, the pixel clock for transmission of video to be displayed at 60 Hz can be reduced to 297 MHz which is a half of the pixel clock shown in FIG. 4B.

FIGS. 5A to 5C illustrate examples of the video timing format of 4K2K video by YCrCb 4:2:0 sampling. The timing format of FIG. 5A corresponds to the case where the pixel encoding method shown in FIG. 4B is used. In this case, as described above with reference to FIG. 4A, when the display frame rate is 60 Hz, the pixel clock is 594 MHz (4400 pixels×2250 lines×60 Hz).

Figure 5B:
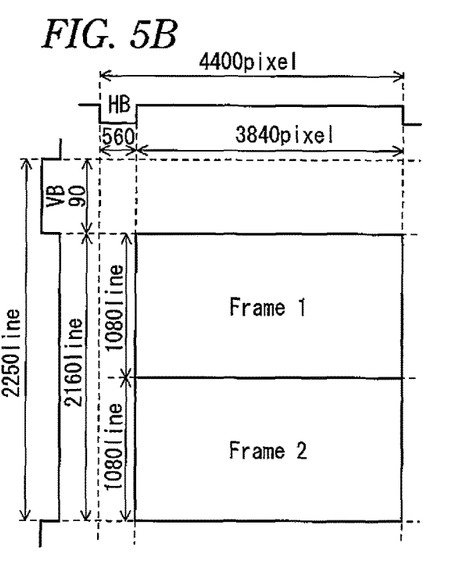
Figure 5C:
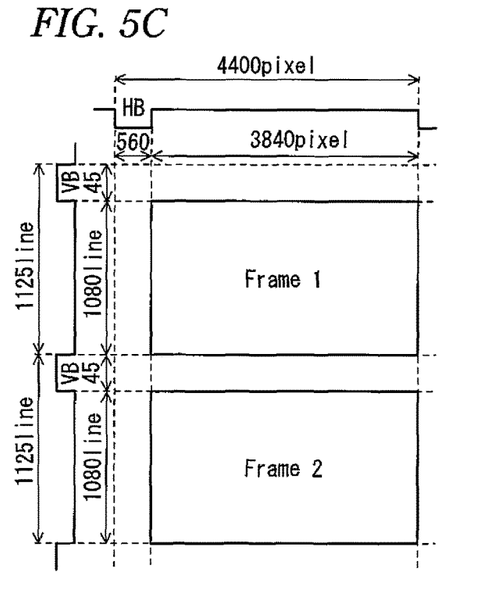

FIGS. 5B and 5C illustrate examples of the timing format in the case where the pixel encoding method shown in FIG. 4C is used. In FIG. 5B, 90 lines are transmitted as VB and one frame is transmitted by the following 1080 lines. The next frame is transmitted by 1080 lines following transmission of the frame. In this method, data are transmitted at 30 Hz by every 2250 lines. Thus, the pixel clock in this method is 297 MHz (4400 pixels×2250 lines×30 Hz).

In FIG. 5C, 45 lines are transmitted as VB and one frame is transmitted by the following 1080 lines. Data are transmitted at 60 Hz by every 1125 (=1080+45) lines. Thus, the pixel clock in this method is 297 MHz (4400 pixels×1125 lines×60 Hz).

That is, in the formats of FIGS. 5B and 5C, the frame rate and the pixel clock can be halved as compared with the format of FIG. 5A.

The timing formats of FIGS. 5B and 5C may be applied for transmission of 3D video. For example, the playback device 100 may transmit the 3D video such that the right-eye frame is transmitted at the position of "frame 1" in FIGS. 5B and 5C and the left-eye frame is transmitted at the position of "frame 2" in FIGS. 5B and 5C.

For example, in the case of FIG. 5B, one of the right-eye frame and the left-eye frame may be assigned to 1-1080 lines after the VB, and the other may be assigned to 1081-2160 lines after the VB.

Figure 6:
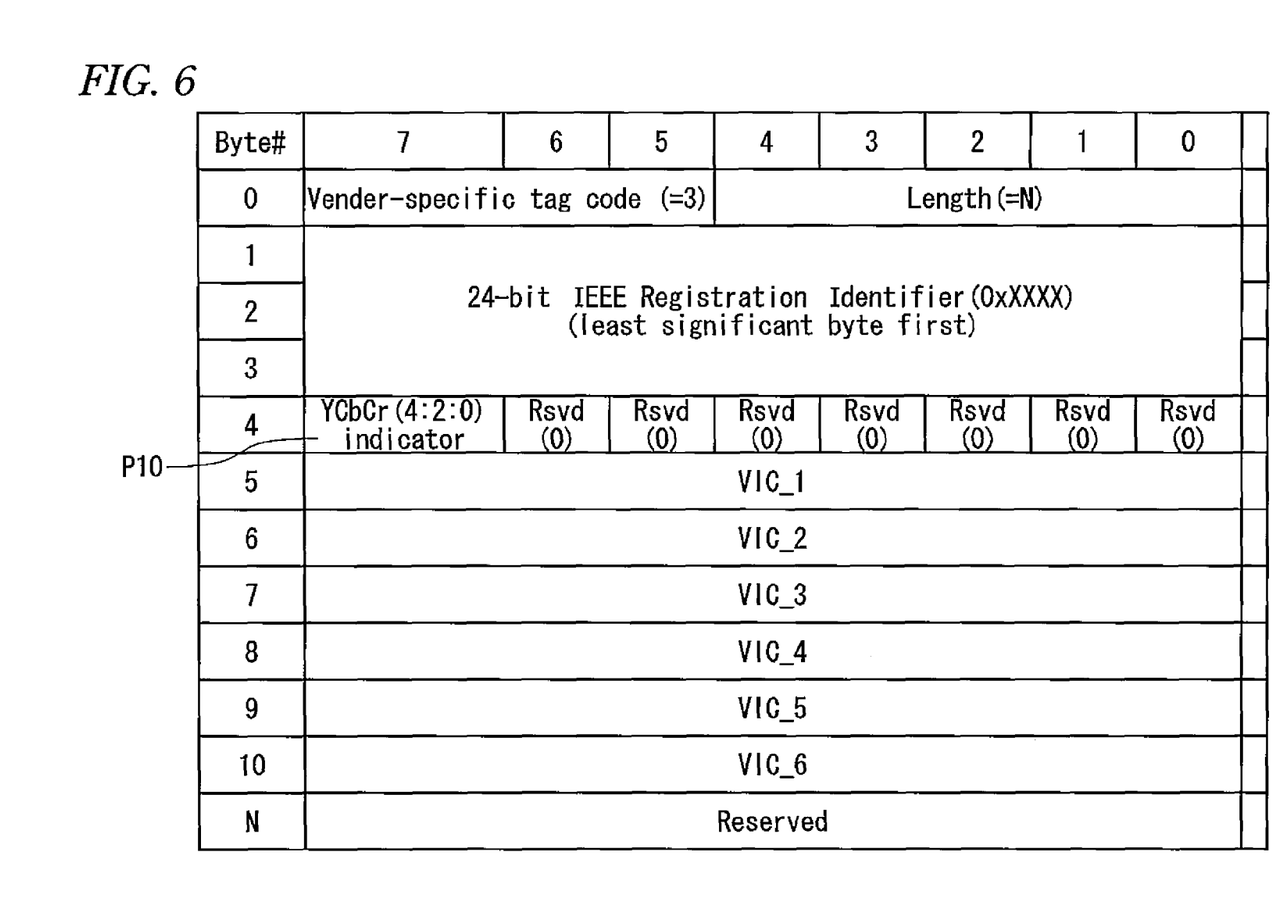
FIG. 6 illustrates a structure of data stored by the communication device.

FIG. 6 illustrates the data configuration of EDID data stored in the EDID 253 by the display device 200. For example, some information VIC (Video Identification Code) 1 to VIC 6 of YCbCr (4:2:0) formats, such as the video timing formats of FIGS. 5B and 5C are stored in P10 of the EDID data, as a format that can be used by the display device 200. Although "YCbCr (4:2:0) indicator" is stored in P10 in FIG. 6, the indicator indicates a usable video format. For example, the indicator indicates the fact that YCrCb (4:2:0) can be used as a transmission format, the fact that the method shown in FIG. 4C can be used as a pixel encoding method, etc.

Figure 7:
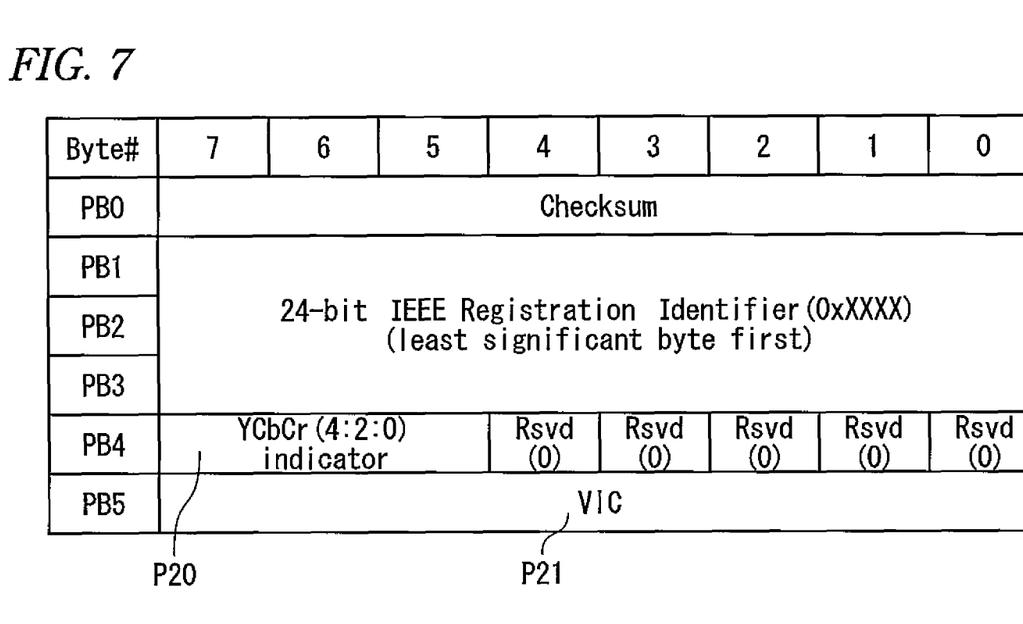
FIG. 7 illustrates a structure of data transmitted by the communication device.

FIG. 7 illustrates the data structure of InfoFrame contained in a video signal transmitted to the display device 200 by the playback device 100. For example, the InfoFrame is superposed on a blank region in FIGS. 5A to 5C. Information indicating the format of video to be transmitted is contained in P20 of the InfoFrame. Although "YCbCr (4:2:0) indicator" is stored in P20 in FIG. 7, the indicator indicates the format of video to be transmitted. That is, for example, the indicator indicates the fact that YCrCb (4:2:0) is used as a transmission format, the fact that the method shown in FIG. 4C is used as a pixel encoding method, etc. VIC contained in P21 corresponds to one of VIC 1 to VIC 6 in FIG. 6.

Figure 8:
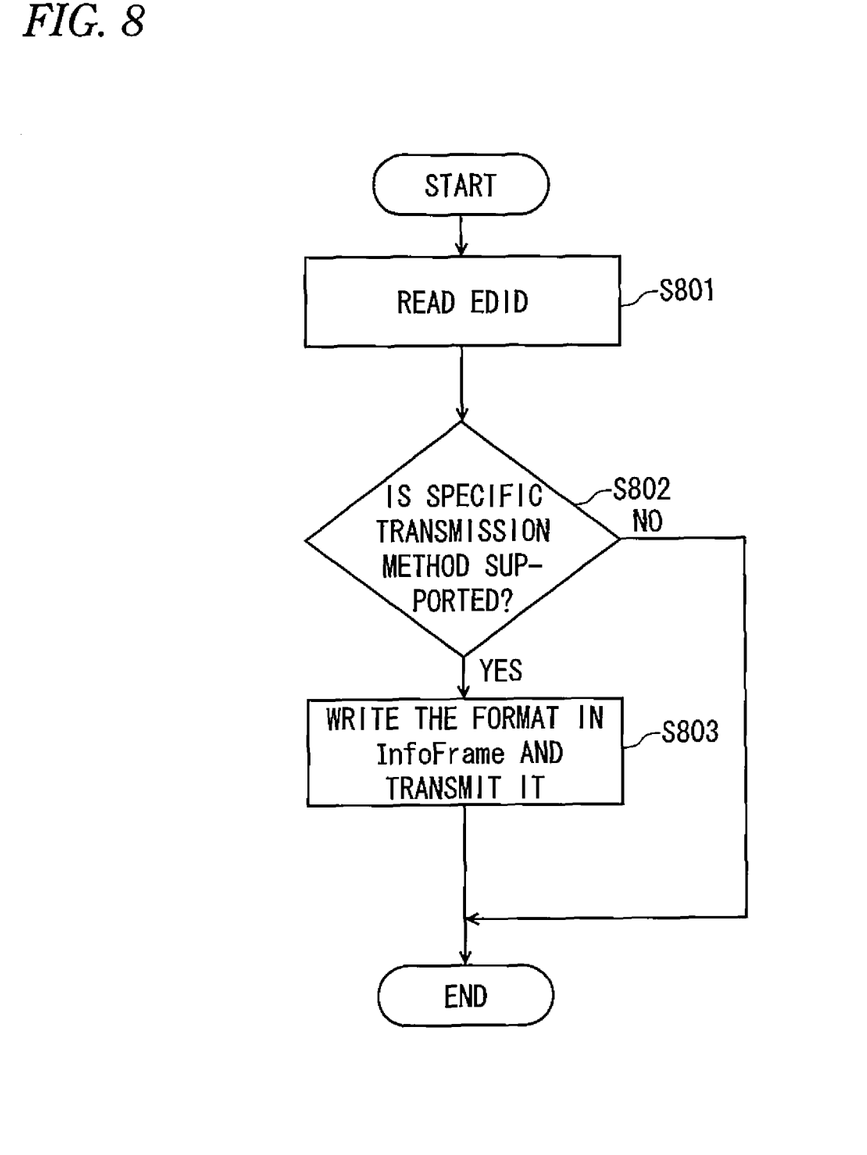
FIG. 8 illustrates a video transmission flow in the communication device.

An example of a video transmission processing in the playback device 100 will be described below with reference to FIG. 8. The playback device 100 reads EDID 253 of the display device 200 by using the communication module 153, when a video to be transmitted to the display device 200 has a specific resolution (e.g. 4K2K) (S801). The micro-computer 152 analyzes the indicator (P10 in FIG. 6) contained in the read EDID to determine whether the display device 200 supports the video format used for the resolution of video to be transmitted by the playback device 100 and for video transmission or not (S802). When the display device 200 supports the video format (Yes in S802), the micro-computer 152 makes control to output a video signal containing InfoFrame indicating the format and resolution of video to the display device 200 (S803). When the display device 200 does not support video to be transmitted (No in S802), the playback device 100 does not perform video transmission.

Figure 9:
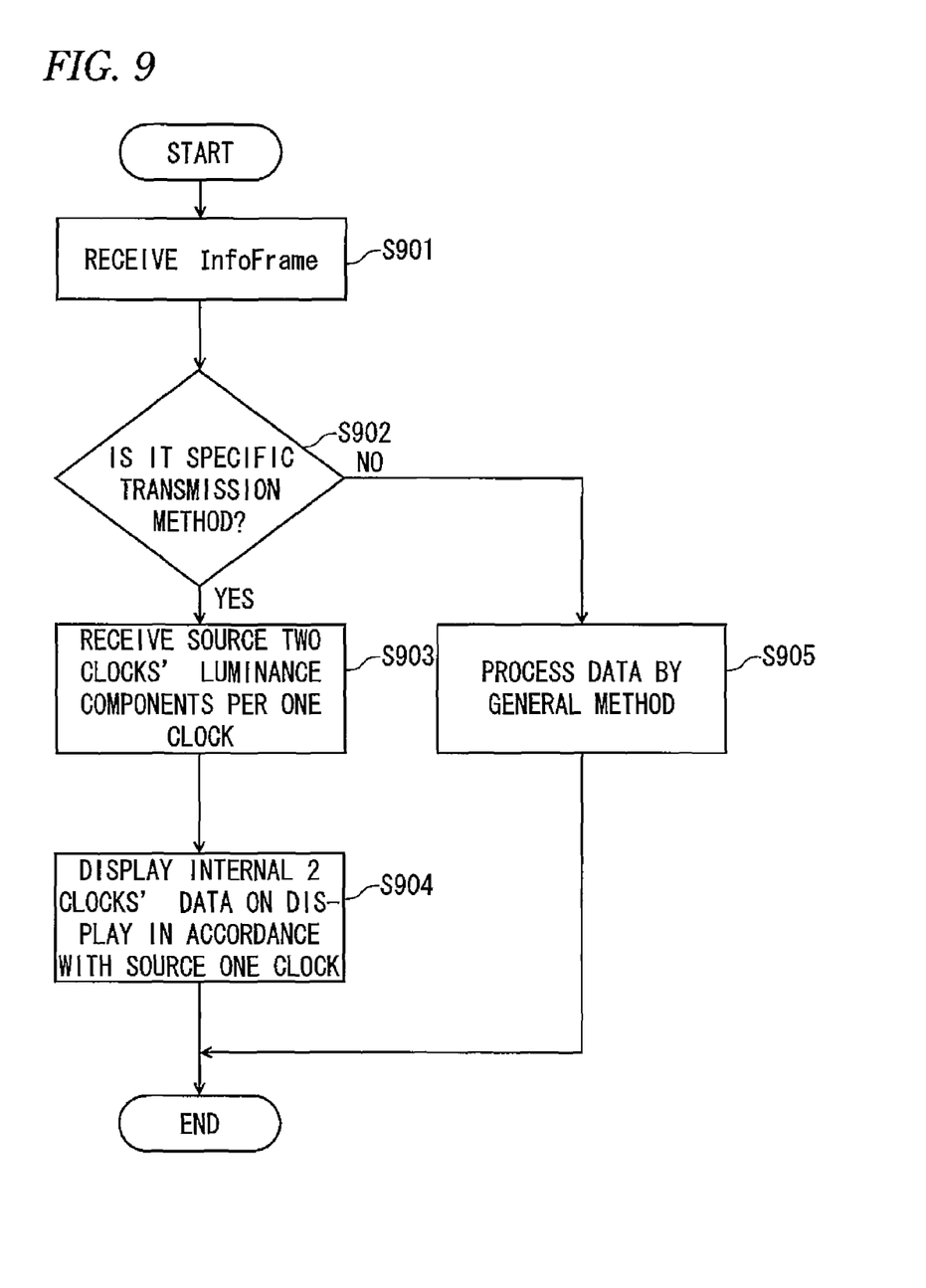
FIG. 9 illustrates a video reception flow in the communication device.

FIG. 9 illustrates a video reception processing in the display device 200. First, the micro-computer 252 receives InfoFrame contained in a video signal transmitted (S901). When the transmission method indicated by the InfoFrame is the method shown in FIG. 4C (S902), the TMDS decoder 251 receives the video signal of the format of FIG. 4C with 2160 lines' video superposed on 1080 lines (S903). Then, the TMDS decoder 251 outputs two lines' video per one line's input video to the display processor 202. On the other hand, when determination in S902 results in that the transmission method indicated by the InfoFrame is a general method (No in S902), the display device 200 converts the input video signal by the general method and outputs the resulting video signal to the display processor 202 (S905).

Although transmission of 4K2K video is exemplified in the embodiment, video of general HD image quality (1920×1080) may be transmitted by means of YCrCb 4:2:0 sampling like this embodiment.

Although the embodiment has been described above, the embodiment is just an example and should not limit the scope of the invention. The novel embodiment may be practiced in other various forms, and part of it may be omitted, replaced by other elements, or changed in various manners without departing from the spirit and scope of the invention. For example, although HDMI Specification has been exemplified in the embodiment, the embodiment may be applied to other communication methods than the HDMI Specification. These modifications will also fall within the scope of Claims and its equivalents.

The invention claimed is:

1. An electronic apparatus comprising:
    a connection terminal to which an external device is connectable through an HDMI cable, the HDMI cable comprising channels 0, 1, and 2 defined under an HDMI standard; and
    at least one hardware processor to:
        receive a 4K2K video comprising
            a first pixel,
            a second pixel,
            a third pixel, and
            a fourth pixel,
                wherein the first pixel is adjacent to the second pixel, the second pixel is adjacent to the third pixel, and the third pixel is adjacent to the fourth pixel;
        generate a video of a 4:2:0 format from the 4K2K video by at least sampling, from the first pixel, the second pixel, the third pixel, and the fourth pixel in the 4K2K video,
            (1) a first luminance value of the first pixel,
            (2) a second luminance value of the second pixel,
            (3) a third luminance value of the third pixel,
            (4) a fourth luminance value of the fourth pixel,
            (5) a first color difference value for all of the first pixel, the second pixel, the third pixel, and the fourth pixel, and
            (6) a second color difference value for all of the first pixel, the second pixel, the third pixel, and the fourth pixel; and
        transmit the video of the 4:2:0 format to the external device using the channels 0, 1, and 2 of the HDMI cable,
    wherein the at least one hardware processor:
        transmits the first color difference value and the second color difference value through the channel 0 of the HDMI cable;
        transmits the first luminance value, the second luminance value, the third luminance value, and the fourth luminance through the channels 1 and 2 of the HDMI cable;
        transmits the first luminance value, the second luminance value, and the first color difference value in the same cycle; and
        transmits the third luminance value, the fourth luminance value, and the second color difference value in the same cycle.

2. The electronic apparatus of claim 1, wherein the at least one hardware processor to:
    acquire correspondence information from the external device indicating whether the external device supports a first method; and
    generate the video of the 4:2:0 format when the correspondence information indicates that the external device supports the first method.

3. The electronic apparatus of claim 1,
wherein, when the 4K2K video is a 3D video comprising a right-eye frame and a left-eye frame, the right-eye frame and the left-eye frame are assigned to respective positions in the video of the 4:2:0 format, the positions being determined with respect to a vertical blank signal.

4. The electronic apparatus of claim 1, wherein the 4K2K video has a resolution of 3840×2160.

5. The electronic apparatus of claim 1, wherein the same cycle comprises the same clock cycle.

6. The electronic apparatus of claim 1, further comprising:
a storage,
wherein the at least one hardware processor reads the 4K2K video from the storage.

7. The electronic apparatus of claim 1, further comprising:
an optical disc drive,
wherein the at least one hardware processor reads the 4K2K video from the optical disc drive.

8. The electronic apparatus of claim 1, wherein the electronic apparatus is a set-top box.

9. The electronic apparatus of claim 1, further comprising a tuner to receive a broadcast signal of a television program.

10. An electronic apparatus comprising:
a connection terminal to which an external device is connectable through an HDMI cable, the HDMI cable comprising channels 0, 1, and 2 defined under an HDMI standard; and
at least one hardware processor to receive a video of a 4:2:0 format from the external device using the channels 0, 1, and 2 of the HDMI cable,
wherein the at least one hardware processor:
  receives a first color difference value and a second color difference value through the channel 0 of the HDMI cable;
  receives a first luminance value, a second luminance value, a third luminance value, and a fourth luminance through the channels 1 and 2 of the HDMI cable;
  receives the first luminance value, the second luminance value, and the first color difference value in the same cycle; and
  receives the third luminance value, the fourth luminance value, and the second color difference value in the same cycle,
wherein the video of the 4:2:0 format is generated from a 4K2K video by at least sampling, from a first pixel, a second pixel, a third pixel, and a fourth pixel in the 4K2K video,
  (1) the first luminance value of the first pixel,
  (2) the second luminance value of the second pixel,
  (3) the third luminance value of the third pixel,
  (4) the fourth luminance value of the fourth pixel,
  (5) the first color difference value for all of the first pixel, the second pixel, the third pixel, and the fourth pixel, and
  (6) the second color difference value for all of the first pixel, the second pixel, the third pixel, and the fourth pixel,
wherein the first pixel is adjacent to the second pixel, the second pixel is adjacent to the third pixel, and the third pixel is adjacent to the fourth pixel.

11. The electronic apparatus of claim 10, further comprising a tuner to receive a television broadcasting signal.

12. The electronic apparatus of claim 11, further comprising a display to perform a video display.

13. The electronic apparatus of claim 12, further comprising:
a decoder to decode the video of the 4:2:0 format; and
a selector to select either one of an output from the tuner and an output from the decoder and to input the selected output to the display.

14. A method comprising:
connecting to an external device through an HDMI cable, the HDMI cable comprising channels 0, 1, and 2 defined under an HDMI standard;
receiving a 4K2K video comprising
  a first pixel,
  a second pixel,
  a third pixel, and
  a fourth pixel,
  wherein the first pixel is adjacent to the second pixel, the second pixel is adjacent to the third pixel, and the third pixel is adjacent to the fourth pixel;
generating a video of a 4:2:0 format from the 4K2K video by at least sampling, from the first pixel, the second pixel, the third pixel, and the fourth pixel in the 4K2K video,
  (1) a first luminance value of the first pixel,
  (2) a second luminance value of the second pixel,
  (3) a third luminance value of the third pixel,
  (4) a fourth luminance value of the fourth pixel,
  (5) a first color difference value for all of the first pixel, the second pixel, the third pixel, and the fourth pixel, and
  (6) a second color difference value for all of the first pixel, the second pixel, the third pixel, and the fourth pixel; and
transmitting the video of the 4:2:0 format to the external device using the channels 0, 1, and 2 of the HDMI cable,
wherein said transmitting comprises:
  transmitting the first color difference value and the second color difference value through the channel 0 of the HDMI cable;
  transmitting the first luminance value, the second luminance value, the third luminance value, and the fourth luminance through the channels 1 and 2 of the HDMI cable:
  transmitting the first luminance value, the second luminance value, and the first color difference value in the same cycle; and
  transmitting the third luminance value, the fourth luminance value, and the second color difference value in the same cycle.

15. The method of claim 14, further comprising:
acquiring correspondence information from the external device indicating whether the external device supports a first method,
wherein said generating is performed when the correspondence information indicates that the external device supports the first method.

16. The method of claim 14,
wherein, when the 4K2K video is a 3D video comprising a right-eye frame and a left-eye frame, the right-eye frame and the left-eye frame are assigned to respective positions in the video of the 4:2:0 format, the positions being determined with respect to a vertical blank signal.

* * * * *